United States Patent [19]

Sakaguchi et al.

[11] Patent Number: 5,289,341
[45] Date of Patent: Feb. 22, 1994

[54] SLIDER FOR A FLOATING MAGNETIC HEAD HAVING TAPERED COIL GROOVE WALLS

[75] Inventors: Seiji Sakaguchi; Tsuyoshi Kubo, both of Kumamoto, Japan; Ryuzo Higashihara, St. Irvine, Calif.

[73] Assignee: Matsushita Electric Industrial Co., Ltd., Osaka, Japan

[21] Appl. No.: 795,895

[22] Filed: Nov. 22, 1991

[30] Foreign Application Priority Data

Nov. 22, 1990 [JP] Japan ................... 2-318467

[51] Int. Cl.⁵ .................................. G11B 5/60
[52] U.S. Cl. ........................................ 360/103
[58] Field of Search ............... 360/103, 104, 102, 123, 360/129, 122

[56] References Cited

U.S. PATENT DOCUMENTS

| | | | |
|---|---|---|---|
| 4,870,520 | 9/1989 | Shaw | 360/103 |
| 4,870,521 | 9/1989 | Okabayashi | 360/103 |
| 4,945,434 | 7/1990 | Wilmer et al. | 360/103 |

FOREIGN PATENT DOCUMENTS

| | | | |
|---|---|---|---|
| 3731283 | 4/1988 | Fed. Rep. of Germany | 360/103 |
| 63-255883 | 10/1988 | Japan | 360/103 |
| 63-269384 | 11/1988 | Japan | 360/103 |
| 1-185815 | 7/1989 | Japan | 360/103 |

Primary Examiner—Stuart S. Levy
Assistant Examiner—Craig A. Renner
Attorney, Agent, or Firm—Lowe, Price, LeBlanc & Becker

[57] ABSTRACT

A floating magnetic head for use in a fixed-type magnetic disk drive has a slider with a coil groove defined therein and opening at the trailing end of the slider. The coil groove has a bottom remote whose width is smaller than the width of the coil groove at the trailing end. The coil groove may be tapered linearly or stepwise, and the bottom may be arcuate in shape. The slider has upper and lower walls between which the coil groove is defined, the upper and lower walls being progressively thicker toward the bottom of the coil groove. The progressively thicker upper and lower walls are mechanically strong against shocks and other excessive forces, and also against stresses applied from coils wound in multiple layers on a core tip inserted in a slit that is defined in the slider across the coil groove.

19 Claims, 6 Drawing Sheets

SLIDER FOR A FLOATING MAGNETIC HEAD HAVING TAPERED COIL GROOVE WALLS

BACKGROUND OF THE INVENTION

1. Field of the Invention

The present invention relates to a floating magnetic head for use in a fixed-type magnetic disk drive or the like.

2. Description of the Prior Art

Some floating magnetic heads for use in fixed-type magnetic disk drives include a slider having a coil groove defined in the trailing end of the slider. The coil groove is substantially rectangular in cross section, i.e., has a width at the trailing end of the slider which is substantially the same as the width of the coil groove at the end opposite from the trailing end.

To give the slider as low a profile as possible, it is necessary to increase the above widths of the Coil groove and to make the coil groove as deep as possible. However, since the increased widths and depth of the coil groove reduce the thicknesses, and increase the lengths, of confronting walls of the slider defining the coil groove therebetween, these confronting walls become highly susceptible to external forces and stresses applied. For example, when the floating magnetic head is manufactured, the walls tend to be easily damaged or broken physical shocks applied to the structure. Furthermore, coils wound around the core tip are liable to impose stresses on the confronting walls, spreading the walls apart and sometimes breaking them. Therefore, conventional floating magnetic heads of the type described are manufactured with a relatively low yield. The mechanically weak walls are also responsible for unstable behaviors of the floating magnetic head in a floating condition.

SUMMARY OF THE INVENTION

It is an object of the present invention to provide a floating magnetic head which prevents the upper and lower walls of a coil groove from being damaged or broken, allows a core tip to produce magnetic flux at an increased intensity, and can be held highly stably in a floating condition.

According to the present invention, a floating magnetic head includes a slider of a nonmagnetic material, the slider having a trailing end with respect to rotation of a magnetic recording medium. The slider has a floating rail on its surface facing the magnetic recording medium, the first floating rail facing the magnetic recording medium, for positioning the slider relative to the magnetic recording medium a coil groove defined in the trailing end and having a bottom remote from the trailing end, and a slit defined in the floating rail across the coil groove. The slider has first and second confronting surfaces of progressively increasing thickness as measured in a direction normal to the surface facing the magnetic recording medium, to define therebetween progressively thickness of the coil grooves from the trailing end toward the bottom. The floating magnetic head also has a core tip fixedly disposed in the slit.

The nonmagnetic material may comprise a ceramic material of CaTiO$_3$ or the like. The slider has a pair of floating rails spaced from each other across the direction and extending in the direction.

The coil groove may be tapered linearly or step-wise from the trailing end toward the bottom. The bottom of the coil groove may be of an arcuate shape.

The slider has upper and lower walls between which the coil groove is defined, the upper and lower walls being progressively thicker toward the bottom of the coil groove. The progressively thicker upper and lower walls are mechanically strong enough to resist shocks and other external forces, as well as other stresses applied from coils wound in multiple layers on the core tip.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

FIGS. 1 through 4 show a floating magnetic head according to an embodiment of the present invention. The floating magnetic head is typically employed in a fixed-type magnetic disk drive or the like.

Figure 1:
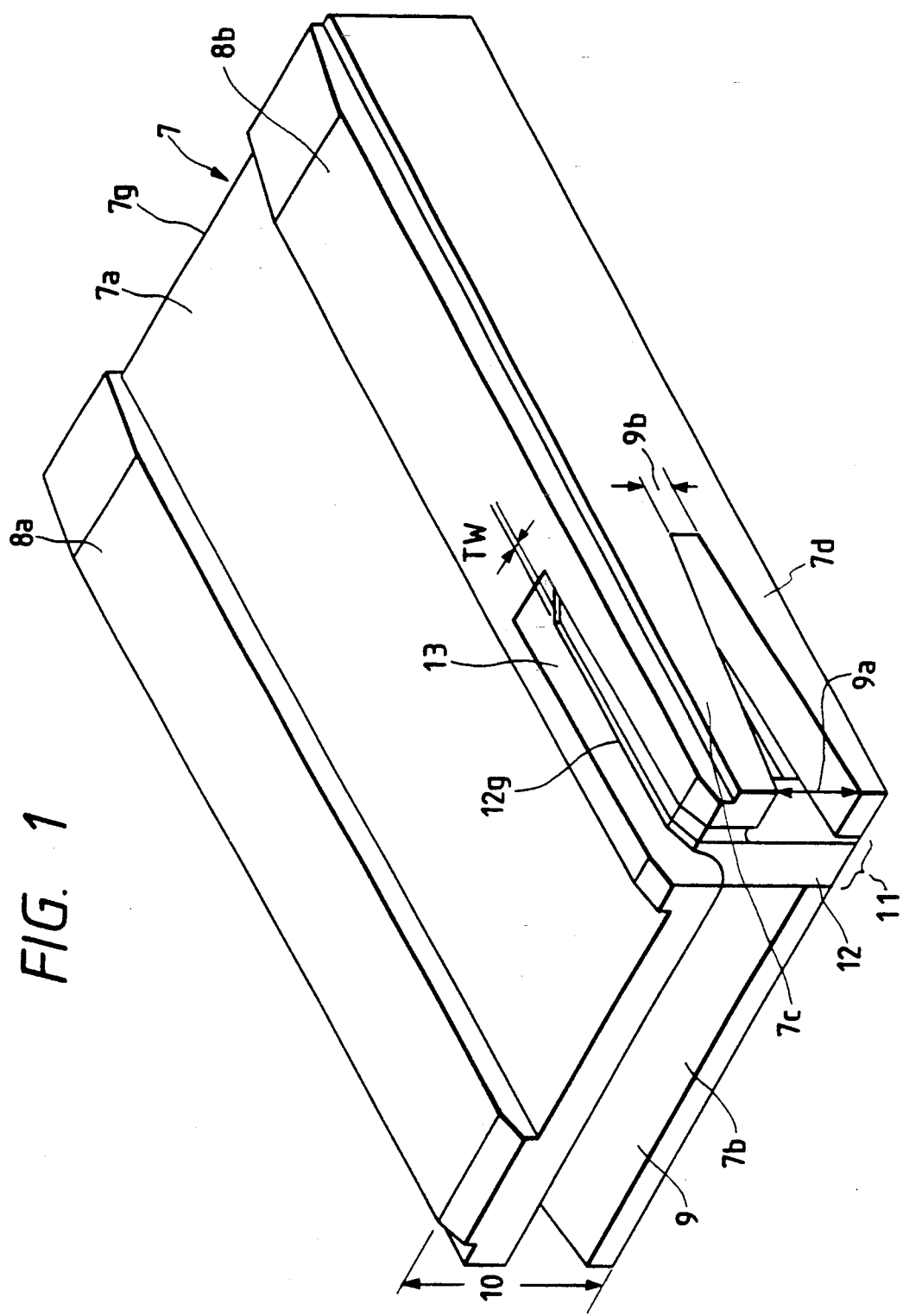
FIG. 1 is a perspective view of a floating magnetic head according to a first embodiment of the present invention.
Figure 2:
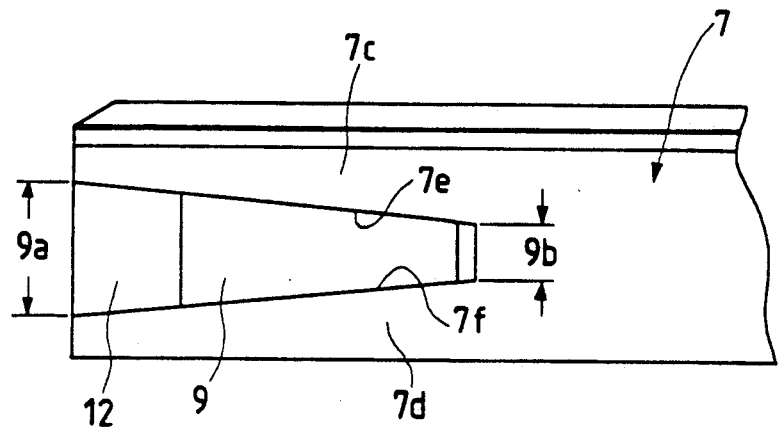
FIG. 2 is an enlarged fragmentary side elevational view of the floating magnetic head shown in FIG. 1.

As shown in FIGS. 1 and 2, the floating magnetic head includes an elongate slider 7 in the shape of a rectangular parallelepiped, the slider 7 being made of a non-magnetic ceramic material such as CaTiO$_3$ or the like. The slider 7 has a pair of laterally spaced floating rails 8a, 8b disposed on a surface 7a which faces a magnetic recording medium, typically a magnetic disk, (not shown). The floating rails 8a, 8b extend along respectively longitudinal edges of the slider 7.

The slider 7 has a coil groove 9 defined in a trailing end 7b thereof with respect to the direction in which the slider 7 is movable with respect to the magnetic recording medium. The slider 7 also has a leading end 7g opposite to the trailing end 7b. The coil groove 9 extends transversely between opposite longitudinal sides of the slider 7 and also extends longitudinally from the trailing end 7b into the slider 7 over a certain depth. The coil groove 9 has a width 9a at the trailing end 7b (where air flows out) and a width 9b at its bottom closer to the leading end 7g (where air flows in), the width 9b being smaller than the width 9a. The coil groove 9 is progressively narrowed, or more specifically tapered linearly, from the trailing end 7b toward the bottom of the groove as the coil groove 9 becomes deeper. The widths 9a, 9b are selected depending on the height 10 of the slider 7. The width 9a should preferably be at least 1.5 times the width 9b. Specifically, if the height 10 is 0.635 mm, then the width 9a should preferably be in the range of from 0.23 mm to 0.56 mm and the width 9b should preferably be in the range of from 0 to 0.15 mm.

The slider 7 also has a slit 11 defined longitudinally in the floating rail 8b across the coil groove 9, the slit 11 being open at the trailing end 7b of the slider 7. The slit 11 is substantially as deep as the coil groove 9.

Figure 3:
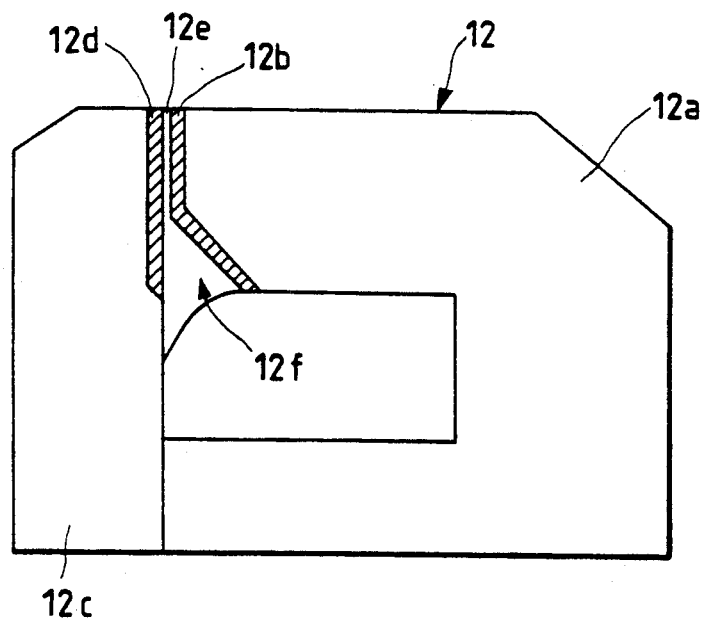
FIG. 3 is an enlarged side elevational view, partly in cross section, of a core tip of the floating magnetic head shown in FIG. 1.

A core tip 12 is disposed in the slit 11 and securely held therein by molded glass 13. As shown in FIG. 3, the core tip 12 comprises a C-shaped core 12a and an I-shaped core 12c both made of a magnetic oxide such as polycrystalline or single-crystal ferrite or the like. The C-shaped core 12a has a gap-facing surface coated with a metallic magnetic film 12b, and the I-shaped core 12c has a gap-facing surface coated with a metallic magnetic film 12d. The metallic magnetic films 12b, 12d are made of Sendust. If the magnetic recording medium to be magnetized by the floating magnetic head has a coercive force ranging from 1,200 to 1,500 oersteds, then the Sendust of the metallic magnetic films 12b, 12d should have a saturation flux density of about 1.2 teslas. The C-shaped core 12a and the I-shaped core 12c are joined to each other in a butt-joint structure by bonding glass 12f with the metallic magnetic films 12b, 12d being spaced from each other by a gap spacer 12e of nonmagnetic material sandwiched therebetween. The bonding glass 12f is of a material type which has a softening point higher than that of the molded glass 13. The gap spacer 12e is in the form of a thin film made principally of $SiO_2$.

As shown in FIG. 1, the core tip 12 has an exposed edge surface 12g for facing the magnetic recording medium, the edge surface 12g being ground into a predetermined track width Tw.

Figure 4:
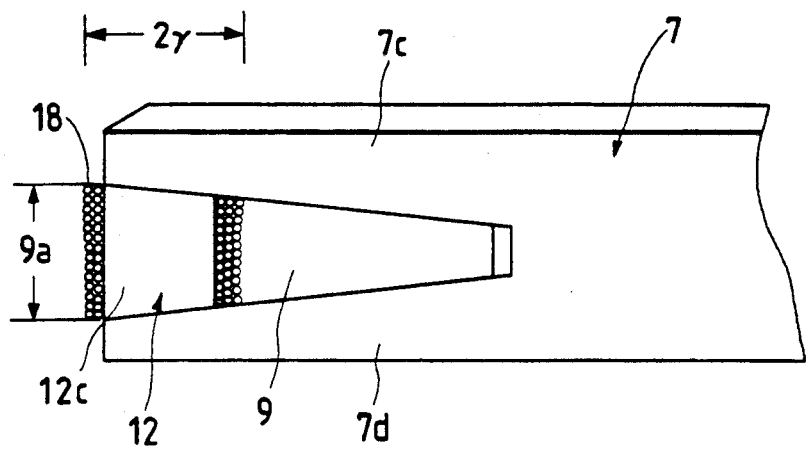
FIG. 4 is a view similar to FIG. 2, showing coils wound on the core tip.

One of the longitudinal sides of the slider 7 has a pair of upper and lower (as viewed in FIGS. 1 and 2) walls 7c, 7d defining therebetween one open side of the coil groove 9. Since the coil groove 9 is tapered toward its bottom, the upper and lower walls 7c, 7d have slanted confronting surfaces 7e, 7f, respectively, that become progressively closer to each other in the direction toward the bottom of the coil groove 9. The upper and lower walls 7c, 7d are therefore progressively thicker toward the of the coil groove 9, they are relatively mechanically strong against shocks or other external forces applied thereto. Therefore, when the floating magnetic head is manufactured, the upper and lower walls 7c, 7d have a less chance to be damaged by forces and stresses imposed thereon. When coils 18 are wound on the core 12 as shown in FIG. 4, the upper and lower walls 7c, 7d are mechanically strong enough to resist stresses applied thereto by the wound coils 18 and tending to spread the upper and lower walls 7c, 7d away from each other. Accordingly, the upper and lower walls 7c, 7d are prevented from being damaged the manufacturing process. The floating magnetic head according to the present invention can therefore be manufactured with a high yield. The mechanically strong upper and lower walls 7c, 7d are also effective to hold the floating magnetic head stably in a floating condition during operation thereof.

Figure 5:
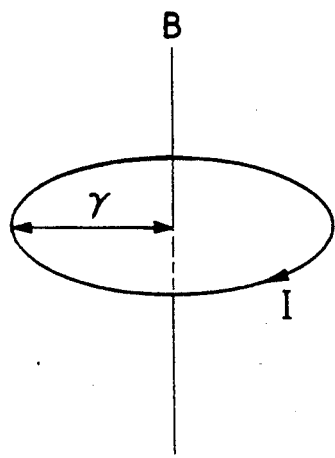
FIG. 5 is a diagram showing the relationship between an electric current and a magnetic field generated thereby.
Figure 6:
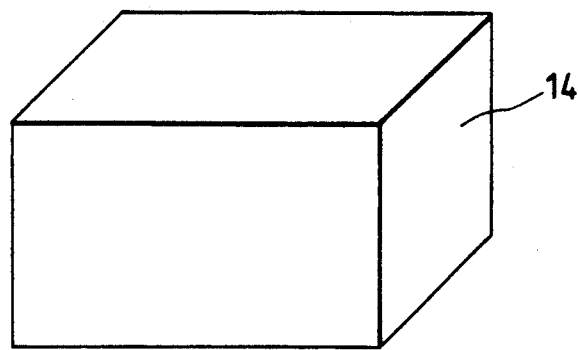
FIGS. 6 through 14 are views showing a process of manufacturing the floating magnetic head shown in FIG. 1.

As shown in FIG. 4, the larger width 9a of the tapered coil groove 9 at the trailing end of the slider allows the coils to be wound in a smaller number of superposed multiple layers outside of the I-shaped core 12c than inside of the I-shaped core 12c. Generally, a magnetic field B generated by an electric current I flowing through a coil having a radius r, as shown in FIG. 5, is expressed by $B = \frac{1}{2}\pi r$. Consequently, the coils 18 wound on the core tip 12 can generate magnetic fluxes at an increased intensity because the radius of the coils 18 is reduced at the coil layers outside of the I-shaped core 12c.

When the thickness of the upper wall 7c at the bottom of the coil groove 9 is greater than the thickness of the lower wall 7d at the bottom of the coil groove 9, the upper wall 7c is rendered mechanically stronger to provide a firm structural basis for keeping the surface of the floating rail 8b smooth over the magnetic recording medium.

A process of manufacturing the floating magnetic head is described below with reference to FIGS. 6 through 14.

Figure 7:
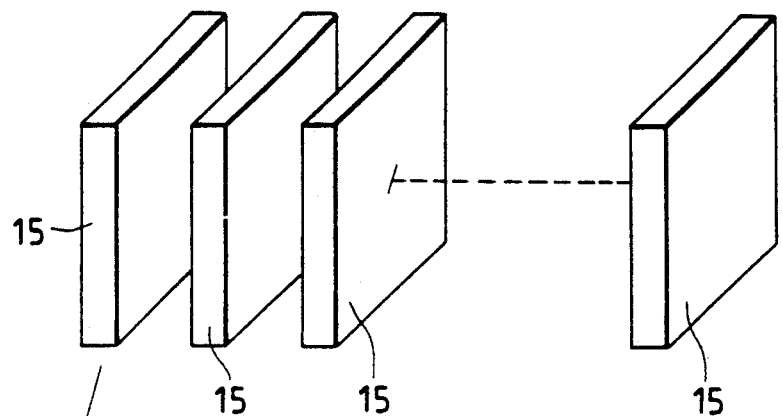
Figure 8:
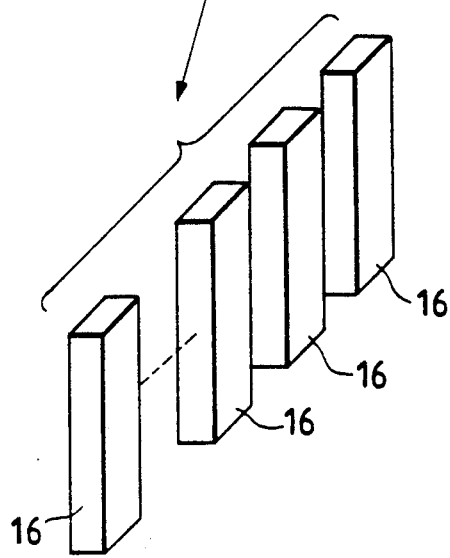
Figure 9:
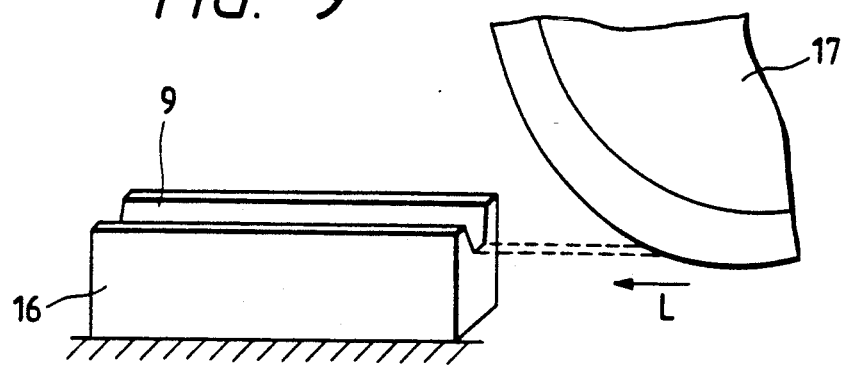
Figures 10, 11:
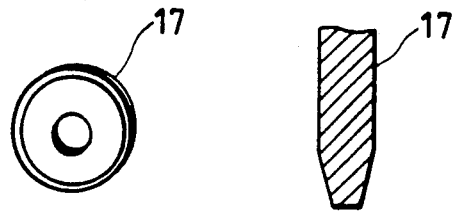

First, a block 14 of a nonmagnetic material such as ceramic (see FIG. 6), is cut into slices 15 as shown in FIG. 7. Then, each of the slices 15 is cut into bars 16 as shown in FIG. 8. As shown in FIG. 9, each bar 16 is fixed to a base by a wax, and a coil groove 9 is defined in one longitudinal side of the bar 16 by a grinding wheel 17 (see also FIG. 10) as it moves in the direction indicated by the arrow L. The grinding wheel 17 has a circumferential cutting edge having a cross-sectional shape as shown in FIG. 11, which is complementary in shape to the coil groove 9. The grinding wheel 17 has an abrasive grain of artificial diamond with its grain size ranging from #500 to #600. The particles of the abrasive grain are bonded by a metallic bonding material. When the coil groove 9 is cut by the grinding wheel 17, the grinding wheel 17 rotates about its own axis at a speed ranging from 4,000 to 8,000 rpm and is fed in the direction indicated by the arrow L at a speed ranging from 60 to 80 mm/min.

Figure 12:
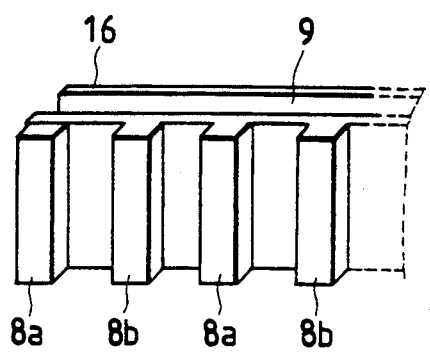
Figure 14:
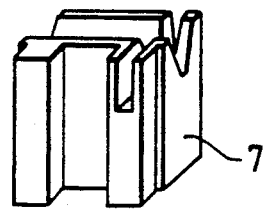
Figure 13:
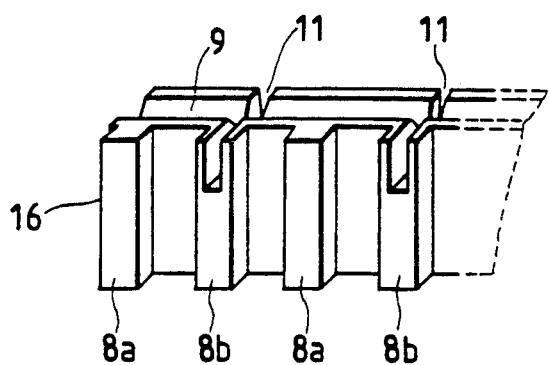

Thereafter, floating rails 8a, 8b are formed on one side of the bar 16 as shown in FIG. 12. Then, slits 11 are defined in the bar 16 at the respective floating rails 8b across the coil groove 9, as shown in FIG. 13. Subsequently, the bar 16 is cut into sliders 7, one of which is shown in FIG. 14.

Then, the core tip 12 is placed in the slit 11 and securely bonded therein by the molded glass 13. The floating rails 8a, 8b of the slider 7 are machined by lapping or the like until the slider 7 is finished up to a predetermined height, whereupon the floating magnetic head as shown in FIG. 1 is completed.

Figure 15:
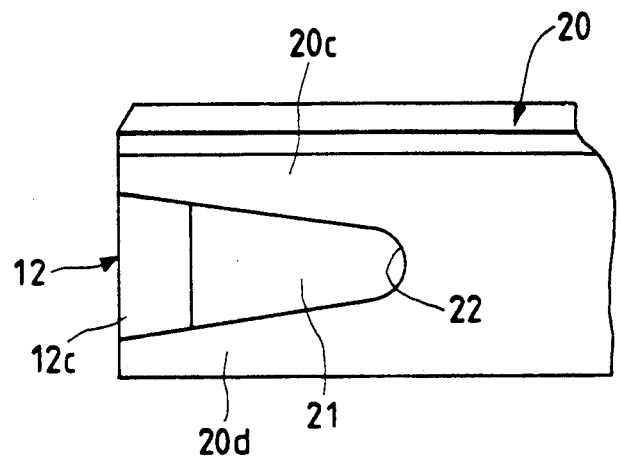
FIG. 15 is an enlarged fragmentary side elevational view of a floating magnetic head according to another embodiment of the present invention.

FIG. 15 is a fragmentary view of a floating magnetic head according to another embodiment of the present invention. In FIG. 15, the floating magnetic head has a slider 20 having a tapered coil groove 21 defined therein between upper and lower walls 20c, 20d. The coil groove 21 has an arcuate bottom 22 remote from the I-shaped core 12c of the core tip 12. Since the arcuate bottom 22 of the coil groove 21 does not have any angular corners, the slider 20 is prevented from cracking under excessive stresses and the arcuate bottom 22 itself is prevented from breaking.

Figure 16:
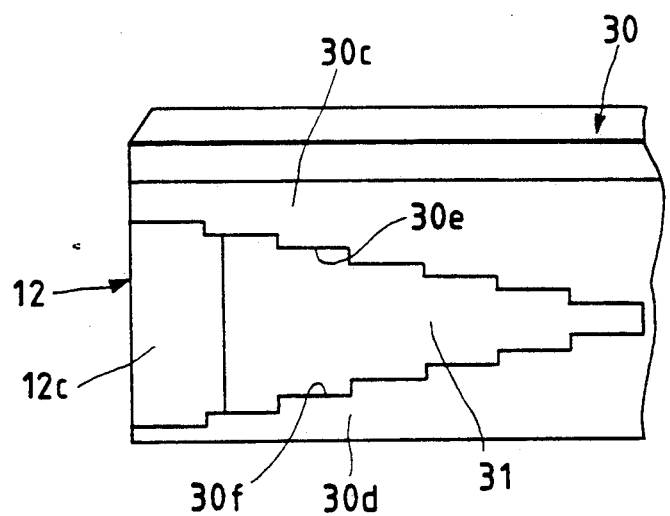
FIG. 16 is an enlarged fragmentary side elevational view of a floating magnetic head according to still another embodiment of the present invention.

FIG. 16 fragmentarily shows a floating magnetic head according to still another embodiment of the present invention. In FIG. 16, the floating magnetic head has a slider 30 having a coil groove 31 defined therein between upper and lower walls 30c, 30d, the coil groove 31 being tapered stepwise toward its bottom. The upper and lower walls 30c, 30d have respective confronting stepped surfaces 30e, 30f. Since coils wound on the I-shaped core 12c and positioned in the coil groove 31 are placed on flat steps of the stepped surfaces 30e, 30f just inside of the I-shaped core 12c, the coils can easily and neatly be wound on the I-shaped core 12c.

Although certain preferred embodiments of the present invention have been shown and described in detail, it should be understood that various changes and modifications may be made therein without departing from the scope of the appended claims.

We claim as our invention:

1. A floating magnetic head comprising:
   a slider of a nonmagnetic material, said slider having a trailing end with respect to rotation of a magnetic recording medium;
   said slider having a first floating rail on its surface facing the magnetic recording medium, said first floating rail facing the magnetic recording medium for positioning the slider relative to the magnetic recording medium, a coil groove defined in said trailing end and having a bottom remote from said trailing end of said slider, and a slit defined in said first floating rail across said coil groove;
   said slider having first and second walls with confronting surfaces, said first and second walls being of progressively increasing thickness as measured in a direction normal to said surface facing said magnetic recording medium, to define therebetween progressively decreasing thickness of said coil groove from said trailing end of said slider toward said bottom of said coil groove; and
   a core tip fixedly disposed in said slit.

2. A floating magnetic head according to claim 1, wherein said nonmagnetic material comprises a ceramic material of CaTiO$_3$.

3. A floating magnetic head according to claim 1, wherein said slider has a leading end opposite to said trailing end with respect to the rotation of the magnetic recording medium, said slider having a second floating rail extending in parallel to said first floating rail with a predetermined space therebetween, said first and second floating rails extending in a direction orienting from said leading end to said trailing end.

4. A floating magnetic head according to claim 1, wherein said coil groove thickness decreases linearly from said trailing end toward said bottom.

5. A floating magnetic head according to claim 1, wherein said bottom of the coil groove is arcuate in shape.

6. A floating magnetic head according to claim 1, wherein said coil groove thickness decreases stepwise from said trailing end toward said bottom.

7. A floating magnetic head comprising:
   a slider of a nonmagnetic material, said slider having leading and trailing ends with respect to rotation of a magnetic recording medium;
   said slider having a pair of floating rails on its surface facing said magnetic recording medium, said floating rails facing the magnetic recording medium for positioning the slider relative to the magnetic recording medium, said floating rails extending along opposite sides of the slider in a direction orienting from said leading end to said trailing end with a predetermined space therebetween, a coil groove defined in said trailing end and having a bottom remote from said trailing end of said slider, said coil groove extending between said opposite sides of the slider, and a slit defined in one of said floating rails across said coil groove;
   said slider having first and second walls with confronting surfaces, said first and second walls being of progressively increasing thickness as measured in a direction normal to said surface facing said magnetic recording medium, to define therebetween progressively decreasing thickness of said coil groove from said trailing end of said slider toward said bottom of said coil groove; and
   a core tip fixedly disposed in said slit.

8. A floating magnetic head according to claim 7, wherein said nonmagnetic material comprises a ceramic material of CaTiO$_3$.

9. A floating magnetic head comprising:
   a slider of a nonmagnetic material, said slider having leading and trailing ends with respect to rotation of a magnetic recording medium;
   said slider having a pair of floating rails on a surface thereof facing said magnetic recording medium, said floating rails facing the magnetic recording medium for positioning the slider relative to the magnetic recording medium, said floating rails extending along opposite sides of the slider in a direction orienting from said leading end to said trailing end with a predetermine space therebetween, a coil groove defined in said trailing end and having a bottom remote from said trailing end of said slider, said coil groove extending between said opposite sides of the slider, and a slit defined in one of said floating rails across said coil groove;
   said coil groove being progressively narrower, as measured in a direction normal to said surface facing said magnetic recording medium, from said trailing end of said slider toward said bottom of said coil groove; and
   a core tip fixedly disposed in said slit,
   wherein said slider has a pair of confronting surfaces tapered linearly from said trailing end toward said bottom, said coil groove being defined between said confronting surfaces.

10. A floating magnetic head according to claim 7, wherein said bottom of the coil groove is arcuate in shape.

11. A floating magnetic head comprising:
    a slider of a nonmagnetic material, said slider having leading and trailing ends with respect to rotation of a magnetic recording medium;
    said slider having a pair of floating rails on a surface thereof facing said magnetic recording medium, said floating rails facing the magnetic recording medium for positioning the slider relative to the magnetic recording medium, said floating rails extending along opposite sides of the slider in a direction orienting from said leading end to said trailing end with a predetermined space therebetween, a coil groove defined in said trailing end and having a bottom remote from said trailing end of said slider, said coil groove extending between said opposite sides of the slider, and a slit defined in one of said floating rails across said coil groove;
    said coil groove being progressively narrower, as measured in a direction normal to said surface facing said magnetic recording medium, from said trailing end toward said bottom; and a core tip fixedly disposed in said slit, wherein said slider has a pair of confronting surface tapered stepwise from said trailing end toward said bottom, said coil groove being defined between said confronting surfaces.

12. A floating magnetic head comprising:

a slider having a trailing end with respect to rotation of a magnetic recording medium;

said slider having a pair of floating rails on its surface facing said magnetic recording medium, said floating rails facing the magnetic recording medium for positioning the slider relative to the magnetic recording medium, a coil groove defined in the slider and having an opening at said trailing end of said slider and a bottom remote from said trailing end of said slider, and a slit defined in one of said floating rails across said coil groove;

said slider having first and second walls with confronting surfaces, said first and second walls being of progressively increasing thickness, as measured in a direction normal of said surface facing said magnetic recording medium, to define therebetween said coil groove having progressively decreasing thickness from said opening of said coil groove toward said bottom of said coil groove; and a core tip fixedly disposed in said slit.

13. A floating magnetic head according to claim 12, wherein said coil groove thickness decreases linearly from said opening toward said bottom.

14. A floating magnetic head according to claim 12, wherein said bottom of the coil groove is arcuate in shape.

15. A floating magnetic head according to claim 12, wherein said coil groove thickness decreases stepwise from said opening toward said bottom.

16. A floating magnetic head according to claim 7, wherein said coil groove has a uniform depth, as measured from said trailing end to said bottom, across an entire width of the slider between said opposite sides.

17. A floating magnetic head comprising:

a slider of a nonmagnetic material, said slider having an air inlet side and an air outlet side with respect to rotation of a magnetic recording medium;

said slider having a floating rail on its surface facing said magnetic recording medium, said floating rail facing the magnetic recording medium for positioning the slider relative to the magnetic recording medium, a coil groove defined in an end surface of the slider at said air outlet side, and a slit defined in said floating rail at said air outlet side, said slit extending along said floating rail and across said coil groove;

a core tip fixedly disposed in said slit and having a magnetic gap;

said slider having a portion located between said surface facing the magnetic recording medium and said coil groove, said portion having progressively increasing thickness, as measured between said surface and said coil groove, from said air outlet side toward said air inlet side to define progressively decreasing thickness of said coil groove as measured in a direction normal to said surface facing said magnetic recording medium said progressively decreasing thickness of said coil groove occurring across the entire width of said slider.

18. A floating magnetic head according to claim 17, wherein said thickness increases continuously from said air outlet side toward said air inlet side.

19. A floating magnetic head according to claim 17, wherein said thickness increases stepwise from said air outlet side toward said air inlet side.

* * * * *